United States Patent
Torsner et al.

(10) Patent No.: US 7,457,260 B2
(45) Date of Patent: Nov. 25, 2008

(54) TRANSMISSION CONTROL METHOD IN A RADIO ACCESS NETWORK IMPLEMENTING AN AUTOMATIC REPETITION REQUEST (ARQ) PROTOCOL AT THE BASE STATION

(75) Inventors: Johan Torsner, Grindbergsgatan (FI); Raul Söderström, Kyrkslätt (SE); Janne Peisa, Espoo (FI); Toomas Wigell, Espoo (FI); Gunnar Bark, Linköping (SE); Ke Wang Hemersson, Linköping (SE); Niclas Wiberg, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 918 days.

(21) Appl. No.: 10/433,889

(22) PCT Filed: Nov. 27, 2001

(86) PCT No.: PCT/EP01/14136

§ 371 (c)(1),
(2), (4) Date: Jun. 5, 2003

(87) PCT Pub. No.: WO02/47317

PCT Pub. Date: Jun. 13, 2002

(65) Prior Publication Data

US 2004/0088641 A1    May 6, 2004

(30) Foreign Application Priority Data

Dec. 9, 2000  (GB) ................................ 0030099.6

(51) Int. Cl.
*H04Q 7/00* (2006.01)
*H04Q 7/20* (2006.01)
(52) U.S. Cl. ...................................... 370/328; 455/436
(58) Field of Classification Search ................. 370/310, 370/328, 331, 342; 445/403, 436, 437, 438, 445/442
See application file for complete search history.

(56) References Cited

U.S. PATENT DOCUMENTS 5,905,871 A *  5/1999  Buskens et al. ............. 709/245

(Continued)

FOREIGN PATENT DOCUMENTS

EP           0 695 053 A2    1/1996

(Continued)

OTHER PUBLICATIONS

Hari Balakrishnan, et al "Improving reliable transport and handoff performance in cellular wireless networks" 8452 Wireless Networks Dec. 1, 1995, No. 4, Amsterdam NL JC Baltzer AG, Science Publishers.

Macdonald, Robert; Search Report for GB 0030099.6 by the UK Patent Office; Aug. 20, 2001 (1 pg.).

*Primary Examiner*—Hassan Kizou
*Assistant Examiner*—Betty Lee
(74) *Attorney, Agent, or Firm*—Roger S. Burleigh

(57) ABSTRACT

A method of controlling the sending of data packets from a Base Station (BS) of a Radio Access Network (RAN) to a UE, where the BS is one of a set of BSs transmitting identical data to the UE and each said data packet has a sequence number. The method comprises implementing at the BS an Automatic Repetition reQuest (ARQ) mechanism for resending data packets erroneously received by the UE and, upon receipt of an ARQ status message from the UE, advancing a transmission window of the BS so that its lower region covers the packet having the highest sequence number for which an ARQ acknowledgement has nor yet been received. Where a single BS is transmitting in the downlink direction, and a soft handover set exists for an uplink reverse channel, downlink sending buffers of the BSs of the soft handover set may be synchronized by the exchange of ARQ messages between BSs.

2 Claims, 3 Drawing Sheets

U.S. PATENT DOCUMENTS

| | | | |
|---|---|---|---|
| 5,940,371 A * | 8/1999 | Mitts et al. | 370/236 |
| 6,115,749 A * | 9/2000 | Golestani et al. | 709/235 |
| 6,161,207 A * | 12/2000 | Lockhart et al. | 714/758 |
| 6,301,479 B1 * | 10/2001 | Roobol et al. | 455/436 |
| 6,341,124 B1 * | 1/2002 | Johansson et al. | 370/335 |
| 6,574,473 B2 * | 6/2003 | Rinne et al. | 455/436 |
| 6,678,523 B1 * | 1/2004 | Ghosh et al. | 455/442 |
| 6,801,512 B1 * | 10/2004 | Cudak et al. | 370/332 |
| 6,816,471 B1 * | 11/2004 | Ludwig et al. | 370/331 |
| 6,907,005 B1 * | 6/2005 | Dahlman et al. | 370/236 |
| 6,934,752 B1 * | 8/2005 | Gubbi | 709/225 |

FOREIGN PATENT DOCUMENTS

| | | |
|---|---|---|
| EP | 1 056 258 A1 | 11/2000 |
| WO | WO 93/06663 | 4/1993 |
| WO | WO 99/23844 | 5/1999 |
| WO | WO/00/42802 | 7/2000 |

\* cited by examiner

TRANSMISSION CONTROL METHOD IN A RADIO ACCESS NETWORK IMPLEMENTING AN AUTOMATIC REPETITION REQUEST (ARQ) PROTOCOL AT THE BASE STATION

FIELD OF THE INVENTION

The present invention relates to controlling the transmission of data in a radio access network of a mobile telecommunications network. More particularly, the invention is concerned with the handling of Automatic Repetition Request (ARQ) messages at mobile terminals and in the radio access network of a mobile telecommunications network.

BACKGROUND TO THE INVENTION

The European Telecommunications Standardisation Institute (ETSI) is currently in the process of standardising a new set of protocols for mobile telecommunications systems. The set of protocols is known collectively as the Universal Mobile Telecommunications System (UMTS). FIG. 1 illustrates schematically a UMTS network 1 which comprises a core network 2 and a UMTS Terrestrial Radio Access Network (UTRAN) 3. The UTRAN 3 comprises a number of Radio Network Controllers (RNCs) 4, each of which is coupled to a set of neighbouring Base Stations (BSs) 5—BSs are often referred to as Node Bs. Each BSs 5 is responsible for communicating with mobile terminals (or User Equipment (UE)) 6 within a given geographical cell, and the controlling RNC 4 is responsible for routing user and signalling data between a BS 5 and the core network 2. The interface between the RNCs is referred to as the Iur interface, whilst that between the BSs and the RNCs is referred to as the Iub interface. The air interface between the UE and the BSs is referred to as the Uu interface. FIG. 1 also illustrates the interfaces present in the conventional UTRAN. A general outline of the UTRAN 3 is given in Technical Specification TS 25.401 V3.3.0 (1999-09) of the 3rd Generation Partnership Project, 3GPP.

Under the UTRAN proposals, certain transmission channels (e.g. DCHs and DSCHs) make use of a mechanism known as Automatic Repetition reQuest (ARQ) to facilitate the retransmission of data packets which are either not received, or are received erroneously by a receiving entity, i.e. a UE or a RNC. The sending of an ARQ status message from a receiver may be ordered under this mechanism, the ARQ status message containing one or more ACKs, indicating the successful receipt of a packet, and/or one or more NACKs, indicating that a packet has not been received or has been received incorrectly. It will be appreciated that the retransmission path, involving as it does passage through a BS, can introduce a considerable delay into the retransmission time and can impact significantly on the performance of higher layer protocols (e.g. TCP).

One way to reduce the length of the retransmission path is to implement a new RAN architecture in which the ARQ mechanism is implemented in the BSs and not in the RNCs. FIG. 2 illustrates an architecture in which user plane and the time critical part of control plane handling is carried out in the BSs and the Gateway (GW) to the core network, whilst non-time critical control plane handling is carried out in the RNC. A new interface between the BSs is created, this being referred to hereinafter as the Iur+ interface. The interfaces of the new network are also illustrated in FIG. 2.

The conventional RAN architecture of FIG. 1 employs a mechanism known as soft handover to enhance system performance at cell borders and to facilitate the smooth transfer of UEs between BSs. During a soft handover, data may be sent and received in parallel between two or more BSs and a UE. At the receiver, information is combined at the physical layer before it is passed to the ARQ protocol (at layer 2). As ARQ is handled at the RNC, the retransmission of data causes no problems (other that the problem of retransmission delay already noted). For data transmission in the downlink direction, the RNC collects ARQ status messages returned from a UE (and forwarded by the various BSs involved in the soft handover) and sorts these to determine which data has been correctly received by the UE and which, if any, must be retransmitted. For data transmission in the uplink direction, the RNC is again able to co-ordinate the receipt of data packets sent from the UE and to transmit appropriate ARQ status messages to the UE.

For certain types of downlink channel it is not desirable to transmit data in parallel to a UE from several BSs. However, the soft handover process described may occur for uplink channels, with the (downlink) sending buffers of the soft handover BS set being synchronised in readiness for a hard handover. This situation is also considered here to be a semi-soft handover situation for the downlink channel.

STATEMENT OF THE INVENTION

The inventors of the present invention have recognised that if the RAN architecture of FIG. 2 is introduced, even though the retransmission time for data is reduced, the processing of ARQ status messages transmitted by a UE, and the sending of ARQ status messages to a UE, is no longer co-ordinated by the RNC. Unless the Base Stations of a soft handover set are located at the same sites (sharing a common RLC entity), the lack of co-ordination may result in a significant deterioration in network performance.

Considering first the downlink direction, where a soft handover is occurring and several BSs are transmitting in the downlink direction in parallel, it is possible that the different streams received by the UE will be time shifted from one another. The UE will check the data packets received from all BSs in the soft handover link set, and will issue an ARQ status message (containing ACKs and NACKs) based on correctly and incorrectly received packets. A BS may therefore receive an ARQ status message containing an ACK for a data packet which it has not yet sent. The ACK will be treated by the BS as an error and may cause the BS to enter a protocol deadlock state.

According to a first aspect of the present invention there is provided a method of controlling the sending of data packets from a Base Station (BS) of a Radio Access Network (RAN) to a UE, where the BS is one of a set of BSs transmitting identical data to the UE and each said data packet has a sequence number, the method comprising implementing at the BS an Automatic Repetition reQuest (ARQ) mechanism for resending data packets erroneously received by the UE and, upon receipt of an ARQ status message from the UE, advancing a transmission window of the BS so that its lower region covers the packet having the lowest sequence number for which an ARQ acknowledgement has not yet been received.

Embodiments of the present invention facilitate the implementation of the architecture of FIG. 2, in which retransmission delays are reduced due to the location of the ARQ mechanism in the Base Stations. Each BS advances its transmission window for ACKs broadcast by the UE in respect of packets previously sent by that BS and other BSs transmitting to the UE.

In order to avoid ambiguity resulting from the wrapping around (i.e. re-use) of PDU sequence numbers and the prolonged low quality of a radio link for a given BS, each BS transmitting to the UE may multicast to the other BS(s) correctly received ARQ status messages. A BS therefore takes into account both ARQ status messages received over the Uu interface and ARQ status messages multicast from the other BS(s) when positioning its transmission window.

In the event that a given BS has managed to send a complete Link Layer (LL) Service Data Unit (SDU) to a UE and has received a corresponding ARQ status message broadcast by the UE, that BS will inform other involved BSs by sending the ARQ status message to them. Receipt of this ARQ status message by a BS causes the BS to remove each Link Layer (LL) Protocol Data Unit (PDU) belonging to that SDU from its buffer.

According to a second aspect of the present invention there is provided a method of controlling the sending of data packets from a Base Station of a Radio Access Network (RAN) to a UE, where the BS is one of a set of BSs transmitting identical data to the UE on respective Dedicated Channels (DCHs) and where each data packet has a sequence number, the method comprising implementing at the BS an Automatic Repetition reQuest (ARQ) mechanism for resending data packets erroneously received by the UE, and advancing a transmission window in accordance with the sequence number(s) contained in ARQ status messages multicast from another BS and/or received over the Uu interface from the UE.

According to a third aspect of the present invention there is provided a Base Station for implementing the method of the above first or second aspect of the invention in a Radio Access Network.

Considering now the uplink direction, two possible mechanisms for avoiding problems at a UE caused by the receipt of conflicting ARQ status messages are proposed.

According to a fourth aspect of the present invention there is provided a method of controlling the sending and resending of data packets from a UE to a plurality of Base Stations (BSs) of a Radio Access Network (RAN), wherein, in the event of receipt at the UE of conflicting ARQ status messages, the method comprises selecting one of said BSs and responding only to ARQ status messages generated at that BS and sent to the UE, until receipt of the complete SDU has been acknowledged by the BS.

According to a fifth aspect of the present invention there is provided a method of controlling the sending and resending of data packets forming a LL SDU from a UE to a plurality of Base Stations (BSs) of a Radio Access Network (RAN), the UE implementing an Automatic Repetition reQuest (ARQ) mechanism for resending data packets erroneously received by the RAN, the method comprising receiving ARQ status messages at the UE from a plurality of BSs, identifying missing or erroneously received data packets, and retransmitting the identified data packets to all of the BSs, the BSs exchanging correctly received data packets to provide at least one of the BSs with the complete LL SDU.

Preferably, once a BS has obtained a complete LL SDU, that BS informs other BSs of the soft handover link set by sending an appropriate ARQ sequence message.

According to a sixth aspect of the present invention there is provided User Equipment (UE) arranged to implement the method of the above fourth or fifth aspect of the present invention.

According to a seventh aspect of the present invention there is provided a method of performing a handover of a downlink channel for a UE from a first active Base Station (BS) to a second BS of a Radio Access Network (RAN), the method comprising, prior to handover, sending data packets destined for the UE to the BSs of a soft handover (SHO) link set comprising said first and second BSs, the SHO link set being associated with an uplink reverse channel of the UE, receiving ARQ status messages at the BSs of the SHO link set and using the ARQ status messages to update the sending buffers of the BSs, initiating the handover from the first to the second BS, and commencing transmission of the data packets of the DSCH from the second BS, wherein the transmission commences with the packet succeeding the packet identified by the last received ARQ status message.

The invention may be employed where said downlink channel is a Downlink Shared Channel (DSCH). Preferably, said ARQ status messages are received at the BSs of the SHO link set over both the Uu and Iur+ interfaces.

DETAILED DESCRIPTION OF A PREFERRED EMBODIMENT

Figure 1:
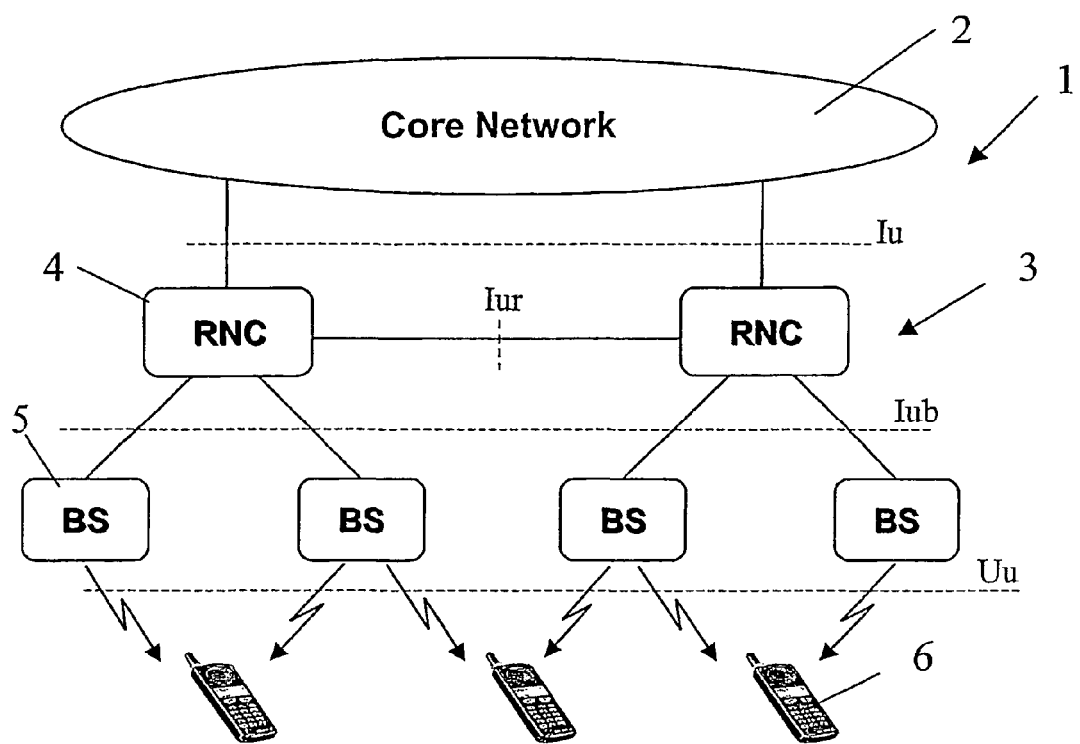
FIG. 1 illustrates the interfaces present in a conventional RAN architecture of a mobile telecommunications network.

A conventional RAN architecture has already been described with reference to FIGS. 1. A modified architecture has been described with reference to FIG. 2, in which Base Stations (BSs) are connected together over an Iur+ interface. Considering now the modified RAN architecture in which the ARQ mechanism is implemented in the UE and the BSs so that ARQ status messages are terminated at the BSs for downlink transmissions and are initiated at the BSs for uplink transmissions, reference is made to FIG. 2 which illustrates the interfaces and certain signalling processes which may exist in this RAN architecture for data transmissions in the downlink direction, i.e. from the network to the UE, during a soft handover.

Each transmitter/receiver entity performs segmentation/concatenation and reassembly between lower layer (LL) and higher layer (HL) Protocol Data Units (PDUs), for example when the RLC ARQ mechanism is used. A HL PDU, which might be an IP packet received from a correspondent host of the UE, is distributed to all BSs included in the active soft handover (SHO) link set of the UE. Each BS has its own transmitter entity with the necessary buffering. The HL PDUs (which are referred to as LL SDUs) are segmented/concatenated if necessary into LL PDUs and placed in the transmission buffer. All of the BSs of the link set send the PDUs to the UE.

The UE has a single entity at the physical layer which receives PDUs from all of the BSs. The ARQ entity is notified of correctly and incorrectly received PDUs (NB. the physical layer may be able to construct a correct PDU from several incorrect PDUs). The ARQ entity acknowledges correctly and incorrectly received packets (as well as missing packets) by sending ARQ status messages (containing ACKs and/or NACKs) to the peer ARQ entities at the sending BSs. The sending of an ARQ status message may be triggered, for example, by the ARQ entity at the UE receiving the last in a sequence of PDUs forming a single LL SDU.

Given that the ARQ status messages are generated based on the collective information received at the UE from all participating BSs, it may happen that a given BS may receive an ARQ status message containing an ACK for a PDU which it has not yet sent. In order to avoid a protocol deadlock situation arising at the BS, the transmitter window of the BS is moved so that its lower region covers the PDU having the highest sequence number for which receipt has not yet been acknowledged. Thus, the window for a given BS is positioned based on the PDUs received by the UE from any or all of the BSs, and not just on the PDUs received by the UE from that BS.

In the event that an ARQ status message containing a NACK is received by a BS from the UE, the BS will respond by retransmitting the requested PDU(s).

Figure 3:
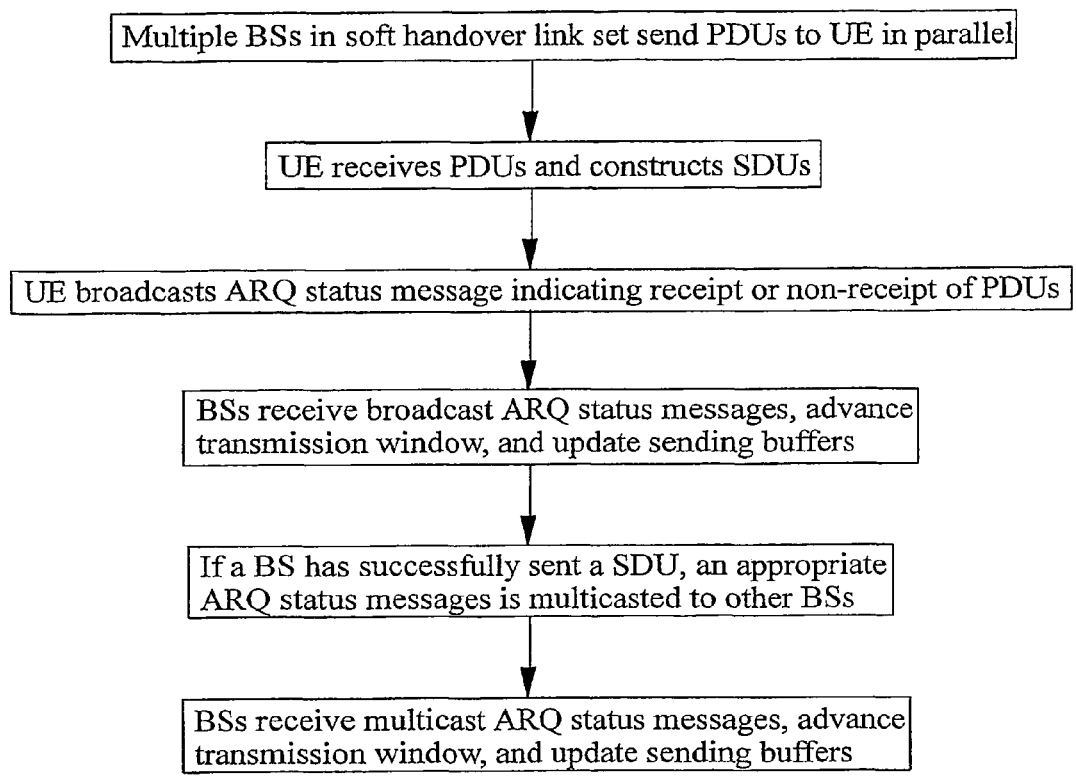
FIG. 3 is a flow diagram illustrating a method of synchronising transmission windows and sending buffers of BSs of the network of FIG. 2.

In an alternative solution to the problem of implementing an ARQ mechanism in the downlink direction for a DCH, the BSs of a soft handover link set may exchange correctly received ARQ status messages (e.g. using multicast procedures), i.e. a BS will multicast an ARQ status message which corresponds to the sending record held by that BS. This enables an ARQ status message which has been correctly received by one BS to be distributed to other BSs which have perhaps not received this message over the Uu interface, or which did receive the message but could not reconcile the message with their own sending records. The exchange of ARQ status messages synchronises the buffers of the various sending BSs, and avoids ambiguity in the LL PDU sequence numbers in the different sending buffers. FIG. 3 is a flow diagram further illustrating a stage in this process.

Figure 2:
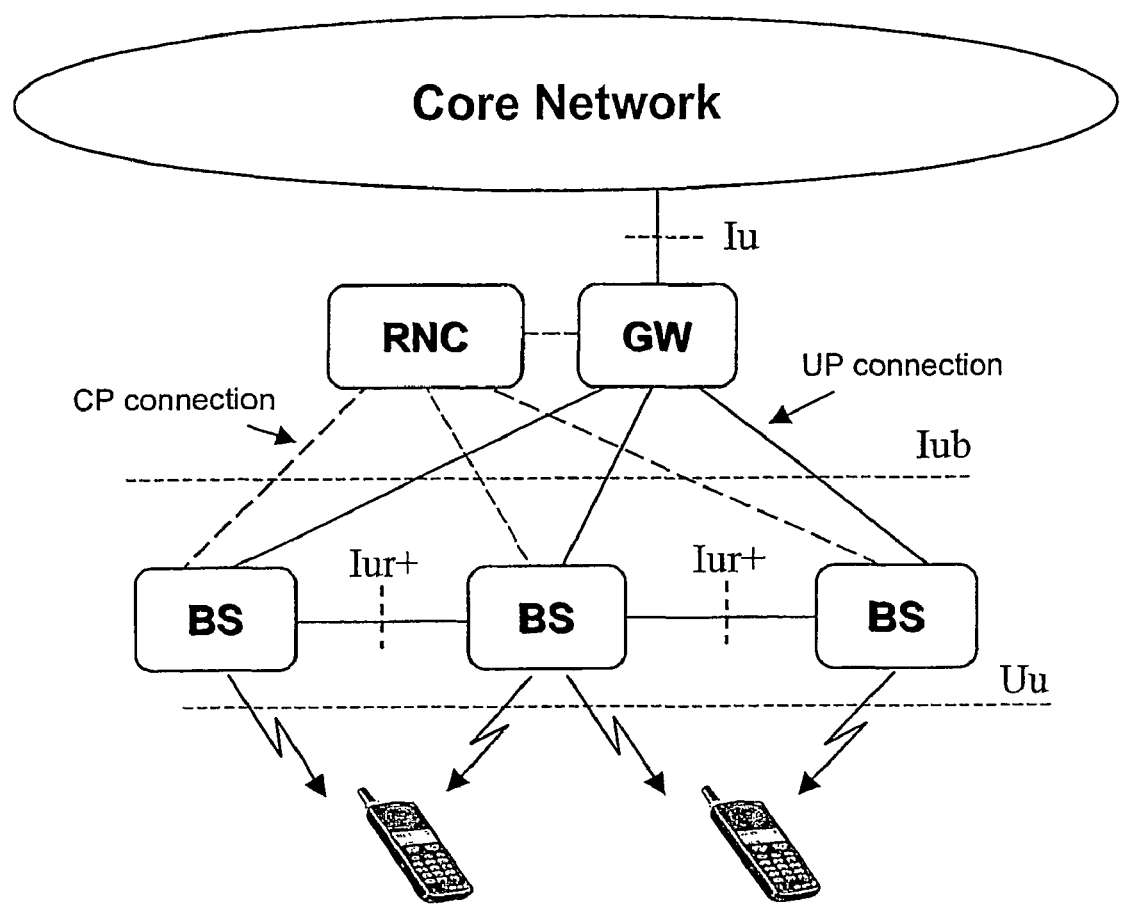
FIG. 2 illustrates the interfaces present in a modified RAN architecture network.

Considering now the sending of data in the uplink direction using the RAN architecture of FIG. 2, at the UE, the HL PDUs (which again might be IP packets) are segmented and concatenated into lower layer PDUs. The UE sends the LL PDUs to all of the BSs of the SHO link set. These BSs identify the correctly and incorrectly received PDUs (as well as missing PDUs), and return appropriate ARQ status messages to the UE. In the event that the UE receives conflicting ARQ status messages from the BSs, there are two ways in which the UE may proceed in order to avoid a protocol deadlock from arising.

Firstly, the UE may select one of the BS links and retransmit packets according to the ARQ status message received on that link. This selection remains until the BS in question has received a complete LL SDU, whereupon the UE sends an ARQ status message in order to clear the RX buffers at the other BSs of the link set. The link selected may be the link requiring the least resources (i.e. least UL energy) to successfully transmit a LL SDU.

Secondly, the UE may only retransmit packets which have not been received by any of the BSs. One of the BSs of the link set is designated as the "master", whilst the other nodes are designated as slaves. Each of the slave BSs sends received retransmitted packets and forwards these to the master BS over the Iur+ interface. Once the master BS has a complete SDU, the SDU is passed to the higher layers at the master BS.

The above description has been concerned with soft handovers between BSs of the RAN of FIG. 2. Whilst soft handover is applied to certain channels such as Dedicated Channels (DCH), it may not be applied to other high bandwidth channels (e.g. DSCHs) which are shared by a number of UEs.

Generally, a UE makes use of a DSCH originating at the BS with which the UE has the best radio connection. However, control signalling informing the UE on when to listen to the shared channel may be transmitted on a separate dedicated channel to which soft handover is applied. The corresponding (reverse) uplink channel is used to transmit ARQ status messages, and soft handover is also applied to this channel.

During a soft handover of such a DCH (carrying signalling related to a DSCH), it is possible that even though the UE is able to receive the DSCH from the sole allocated BS, the ARQ status messages are transmitted by the UE at such a low power level that only one BS participating in the soft handover receives them. This BS need not be the same BS which is transmitting the DSCH. Providing a smooth handover of the DSCH is also problematic if the ARQ mechanism is located in the BSs. As all data is buffered at the BSs, changing the BS transmitting the DSCH can result in the dropping of packets and/or the need to transfer a large number of packets between BSs which introduces a delay and increases network traffic. This can in turn result in a loss in performance at the higher layers, e.g. TCP must attend to the retransmission of data. Neither of these problems exist for the conventional architecture of FIG. 1.

A solution to this problem, which arises when the ARQ mechanism is located in the BSs, is to multicast all data packets arriving at the RAN to the BSs of the active soft handover (SHO) link set associated with the DCH. However the DSCH data flow is transmitted only from one active BS. The UE sends feedback ARQ status messages to all BSs belonging to the SHO link set. All BSs belonging to the active soft handover link set exchange ARQ status messages over the Iur+ interface. The BS transmitting on the shared channel may receive ARQ status messages from other BSs in the event that the transmitting BS has not itself received these messages (because the quality of its own backward channel is too low). The idle BSs use the ARQ status messages to update their sending buffers, so that the buffers are partially synchronised with the active BS. Thus, when a handover of the DSCH occurs, the new active BS can begin transmitting at, or near, the point where the previously active BS left off. It will be appreciated that problems caused by the failure of the active BS (or indeed the idle BSs) to correctly receive ARQ status messages may be overcome using one of the methods described above.

The invention claimed is:

1. A method of controlling the sending and resending of data packets forming a Link Layer Service Data Unit (LL SDU) from a User Equipment (UE) to a plurality of Base Stations (BSs) of a Radio Access Network(RAN), the UE implementing an Automatic Repetition reQuest (ARQ) mechanism for resending data packets erroneously received by the RAN, the method comprising receiving ARQ status messages at the UE from a plurality of BSs, identifying missing or erroneously received data packets, and retransmitting the identified data packets to all of the BSs, the BSs exchanging correctly received data packets to provide at least one of the BSs with the complete LL SDU.

2. A method according to claim 1, wherein, once a BS has obtained a complete LL SDU, that BS informs other BSs of a soft handover link set by sending an ARQ status message.

* * * * *